United States Patent Office 3,461,960
Patented Aug. 19, 1969

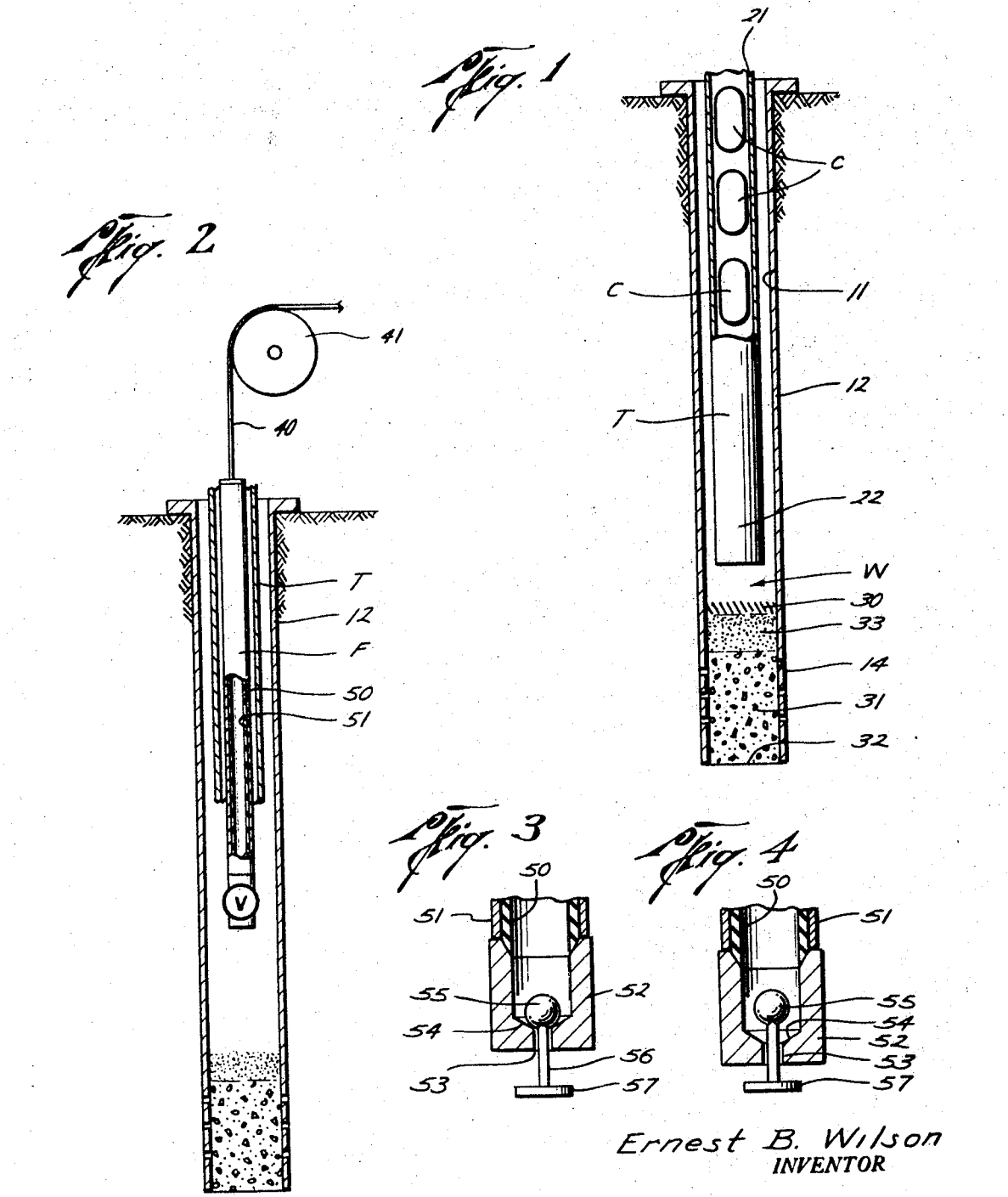

3,461,960
METHOD AND APPARATUS FOR DEPOSITING CEMENT IN A WELL
Ernest B. Wilson, 55 Tiel Way, Houston, Tex. 77019
Filed May 8, 1967, Ser. No. 636,879
Int. Cl. E21b 33/13, 41/00
U.S. Cl. 166—168                              1 Claim

---

ABSTRACT OF THE DISCLOSURE

A method and apparatus for depositing water activated cement, either wet or dry in a well bore wherein such cement is encapsulated in capsules which are water soluble or which disintegrate in water or breakable containers which are dropped into the bottom of the well bore where the capsules break or disintegrate to release the wet cement, and in those instances where dry cement is used, the water also activates the cement.

---

Background of the invention

In many instances in plugging or recompleting wells, it is desirable to deposit cement in the well bore to fill the casing and make a new bottom in the well at a higher elevation than the previous bottom. Generally this has been done either by pumping cement down the tubing as in a squeezing operation performed by Halliburton, or by use of a relatively long small bore metal barrel such as that used by Schlumberger, that is lowered through the tubing on a wireline to the bottom of the well where a valve at the lower end of the barrel is actuated to dump the cement contained therein at the bottom of the well. Both of these operations require use of large and expensive equipment, and as a consequence are relatively expensive to perform. The Schlumberger wireline barrel is made up of a plurality of joints or sections of rigid thin wall pipe which are each approximately ten feet in length. Due to the small internal diameter of the barrel sections, three or four of such sections are used in order to get the desired quantity of cement slurry to the bottom of the well in a single run. However, twists and bends in the tubing frequently prevent a rigid barrel more than ten feet long from passing therethrough and, therefore, require that the long barrel be withdrawn from the well and one or more sections disconnected before another attempt is made with a shorter barrel. Another disadvantage of this type of barrel is that it sometimes becomes stuck in one of the twists or bends in the tubing and requires a fishing operation in order to retrieve it. In other instances, this type barrel may remain lodged in the tubing for a sufficient length of time that the cement slurry in the barrel sets up and becomes solidified. Being restricted to a shorter barrel, of course, reduces the volume of cement which can be carried in a single trip down the hole and therefore increases the number of trips required in order to get the desired amount of cement on the bottom and, of course, also increases the over-all cost of the cementing operation.

Brief summary of the invention

An advantage of the method and apparatus of the present invention is that it provides a way of depositing dry cement or cement slurry at the bottom of a well which obviates the need for the large and expensive surface equipment theretofore required. Furthermore, the present invention does not require a skilled operator specially trained to use the device or method taught herein. The operator may simply place the desired quantity of cement either dry or in a slurry in the capsules or containers and drop them to the bottom of the well. In case there is a string of tubing in the well, the relatively short individual capsules will pass through any normal twist or bend in the tubing and travel the entire distance to the bottom of the well without becoming lodged therein. In the event there is water in the well bore, the cement will settle to the bottom of the water and will set up and cure properly even though submerged.

It is therefore an object of the present invention to provide a new and improved method and apparatus for depositing cement in a well bore.

Brief description of the drawings

FIG. 1 of the drawings is a partially schematic, vertical sectional view of a well bore and the surrounding formation showing the cement being deposited therein;

FIG. 2 is a partially schematic vertical section view of a well bore showing details of alternate embodiment of the present invention;

FIG. 3 is a partial sectional view showing a valve used in the FIG. 2 embodiment of this invention in closed position; and FIG. 4 is similar to FIG. 3 except the valve is in an open position.

Description of the preferred embodiment

As shown in FIG. 1 of the drawings, the present invention is used to provide a new bottom in a well designated generally W. Such well normally comprises a bore or hole 11 which is cut or drilled into the earth E to a desired depth. Casing 12 is usually set in the bore hole 11 and cemented therein in a manner well known in the art. Thereafter, perforations 14 are cut in the casing to communicate the interior of the casing 12 with the surrounding formations for conducting fluids therefrom. Tubing T usually extends from some point near the perforations 14 upwardly to the top of the well for conducting fluids produced from the formation surrounding the perforations 14 upwardly to the earth's surface. In those instances when it is desired to plug the perforations 14, such as when the surrounding formations are either proven not to be commercially productive or when production has substantially depleted that particular formation, the method and/or apparatus of the present invention may be used.

In the preferred form of this invention, capsules or containers C which are made of material that is soluble in water or that disintegrates when wet or frangible material as will be explained in detail hereinafter and which contain either a dry cement or a wet cement slurry are dropped into the top of tubing T at the earth's surface and fall by gravity to the bottom of the well W. If desired, sand may be included in the capsule C. In either event, whether the cement is deposited in capsule C dry or whether the cement slurry is prepared at the surface, the capsules are filled with cement and a sufficient number of the capsules are deposited in a well to provide a desired quantity of cement.

Such capsules may be formed of gelatin, such as those normally used for medicine capsules that normally dissolve in water at temperatures above 90° F. Such containers may also be formed of paper or other cellulose material or the like which have sufficient strength to inhibit premature breaking or parting before reaching the well bottom and which will dissolve or disintegrate in a relatively short time in the well.

Such capsules C are dropped into the upper end 21 of the tubing T and then fall by gravity through such tubing T and out the lower end 22 to provide a new bottom 30.

As shown, the lower end 22 of the tubing string is spaced above the desired elevation of the new bottom a sufficient distance to allow room for the desired quantity of cement without such cement engaging the lower end 22 of the tubing T. Frequently gravel 31 is packed on top of the old bottom 32 up to approximately the desired elevation of the new bottom. Send 33 is then placed on the gravel 31 to support the cement and prevent it from running down into the spaces in the gravel.

In those instances where the well bore is relatively dry, the cement may be placed in the capsule dry and water added by pouring it down the tubing string into the well bore to activate the cement.

In an alternate embodiment of this invention, capsules made of frangible material which will break from the impact of striking the bottom when it falls to the bottom of the well bore may be used for conveying either dry cement or cement slurry to the bottom of the well. In such case, the capsules or container C may be made of glass or brittle plastic or some other substance which will fracture upon impact at the bottom of the well.

Another alternate embodiment of the apparatus of the present invention is shown in FIG. 2 of the drawings which comprises a flexible tube or barrel F adapted to be lowered through the tubing to the bottom of the well on a wireline. The flexible barrel F is connected at its upper end to the wireline 40 which runs on the sheave or pulley 41 and is wound on a drum (not shown). The flexible tube F may be formed of soluble material that can be lowered to the bottom of the well and there dissolved.

As shown in FIG. 2 of the drawings, the flexible tube F may be formed with a liner 50 of rubber or plastic or some other flexible or pliable material, and, if desired, may have a braided protective or reinforcing cover 51 of metal or nylon or the like surrounding the rubber or plastic flexible liner 50. Thus, the flexible tube or barrel F when lowered through the tubing T will conform to the various twists and bends in the pipe and will pass therethrough rather than becoming lodged or stuck as does the rigid type of barrel heretofore used. Such flexible or pliable barrel F is provided with a dump valve at its lower end 59 for dumping the contents from the barrel F when it reaches the bottom of the well bore. One type of valve which may be used is shown in FIGS. 3 and 4 of the drawings.

Such valve comprises a valve body 52 having a passage 53 extending therethrough with a tapered annular seat 54 extending around such opening 53 for receiving a ball valve or other suitable type of valve 55 which when in the closed position shown in FIG. 3 engages the annular seat 54 to close the opening 53. The ball valve 55 preferably has a stem 56 connected thereto and depending downwardly therefrom which extends through the opening and which has a T bar or cross member 57. When the flexible barrel F is lowered into the tubing T to the bottom of the well, the cross bar 57 engages the bottom. Thereafter, when the barrel F is lowered further, the annular seat 54 moves downwardly away from the ball valve 55 to open the passage or opening 53 to allow the cement thereabove in the flexible barrel to pass therethrough. It will be appreciated that the valve arrangement shown and described herein is illustrative of one type of valve which may be used; however, other types of valves may be used which will enable the load of cement in the flexible tube F to be released or dumped when the flexible tube F is adjacent the bottom of the well bore.

I claim:
1. An apparatus for depositing cement at the bottom of a well bore comprising:
    (a) a longitudinally extending flexible body including an inner pliable liner encased in a braided protective jacket;
    (b) means at the upper end of said body for connecting same to a wireline; and
    (c) valve means at the lower end of said flexible body for releasing the contents thereof at the bottom of a well bore.

References Cited

UNITED STATES PATENTS

| 1,450,485 | 4/1923 | Cousins | 166—168 X |
| 1,523,604 | 1/1925 | Miller | 166—168 |
| 2,609,880 | 9/1952 | Dyer | 166—117 |
| 3,170,516 | 2/1965 | Holland et al. | 166—23 |
| 3,190,373 | 6/1965 | Weathersby | 166—21 X |

FOREIGN PATENTS 9,064    2/1923    Netherlands.

JAMES A. LEPPINK, Primary Examiner

U.S. Cl. X.R.

166—117, 286